(12) United States Patent
Kronenberg et al.

(10) Patent No.: US 6,433,335 B1
(45) Date of Patent: Aug. 13, 2002

(54) GEIGER-MUELLER TRIODE FOR SENSING THE DIRECTION OF INCIDENT IONIZING GAMMA RADIATION

(75) Inventors: Stanley Kronenberg, Skillman; George J. Brucker, West Long Branch, both of NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 107 days.

(21) Appl. No.: 09/679,160

(22) Filed: Oct. 3, 2000

(51) Int. Cl.$^7$ .................................................. G01T 1/29
(52) U.S. Cl. .................... 250/304; 250/304; 250/385.1; 250/374
(58) Field of Search .............................. 250/304, 385.1, 250/374

(56) References Cited

U.S. PATENT DOCUMENTS

| | | |
|---|---|---|
| 5,345,084 A | 9/1994 | Byrd et al. |
| 5,665,970 A | 9/1997 | Kronenberg et al. |
| 5,796,110 A * | 8/1998 | An et al. ................. 250/385.1 |

OTHER PUBLICATIONS

S. Kronenberg et al., "Directional detector for arrays of gamma ray and X–ray sources", Nuclear Instruments and Methods in Physics Research A vol. 378, pp. 531–540, 1996.
S. Kronenberg et al., "Locating and imaging sources of gamma and X–radiation directly or through thick shields", Nuclear Instruments and Methods in Physics Research A vol. 387, pp. 401–409, 1997.
S. Kronenberg et al., "High Angular Resolution Sensing of Gamma Rays In Space", Published in SPIE, The International Society for Optical Engineering, Conference Journal, vol. 3116, pp. 49–56, 1997

* cited by examiner

*Primary Examiner*—Bruce Anderson
*Assistant Examiner*—Zia R. Hashmi
(74) *Attorney, Agent, or Firm*—Michael Zelenka; George B. Tereschuk

(57) ABSTRACT

A Geiger-Mueller triode directional sensor is provided to detect the direction of incident ionizing gamma radiation, comprising a housing divided into two subchambers, or GM counters, separated by a partition composed of a high Z layer of tungsten, the tungsten partition having an aperture for gas to freely communicate between the subchambers and maintain an identical gas mixture in both subchambers, radiation windows, external layers of a second material in the sidewall and a sensor. Incident gamma rays generate electrons within the tungsten partition, housing and the sidewall based on the photoelectric, Compton and pair effects. The electrons penetrate the radiation windows and are accelerated by an applied electric field in the housing, causing the electrons to ionize the gas within the housing and produce electrical discharges. A rotating sensor and signal detecting means receives the electrical charges and the electronic signals are counted to determine angle of rotation and locate the unknown sources of gamma radiation. Another embodiment of the present invention provides a method for sensing the direction of ionizing gamma radiation.

56 Claims, 4 Drawing Sheets

GEIGER-MUELLER TRIODE FOR SENSING THE DIRECTION OF INCIDENT IONIZING GAMMA RADIATION

GOVERNMENT INTEREST

The invention described herein may be manufactured, used, sold, imported, and/or licensed by or for the Government of the United States of America without the payment to us of any royalties thereon.

FIELD OF INTEREST

The invention relates to radiation sensors and, more particularly, to a Geiger-Mueller triode for detecting the direction of incident ionizing gamma radiation.

BACKGROUND OF THE INVENTION

It is often desirable to determine the direction or distribution of gamma radiation such as in tomography, astronomy, and civil defense applications, and to locate the sources of radioactivity emitting these photons. Various techniques have been used to provide detectors with a directional capability. One commonly used directional detector is a collimated instrument with shielding restricting the angular acceptance of radiation by the detector and reducing background contributions from other directions. The collimated instruments suffer from several disadvantages including distortion by interactions with the collimator walls, a small solid angle of acceptance thus reducing radiation intensity and poor angular resolution when a large solid angle of acceptance is necessary.

Another approach is described in Byrd et al., U.S. Pat. No. 5,345,084 entitled, "Directional fast-neutron detector," which discloses a directional radiation detector for detecting fast neutrons, with fast neutron radiation detectors arranged in a close packed relationship to form a segmented symmetric detector. In this device, a processor arithmetically combines the incident radiation counts from the detectors to output a signal functionally related to a direction of a radiation source and the detector only detects the direction of fast neutrons and has a low directional resolution.

Kronenberg et al. U.S. Pat. No. 5,665,970, entitled, "Directional Radiation Detector And Imager," disclosed forming a radiation sensor by sandwiching two materials having different atomic numbers (Z) around Geiger-Mueller and Scintillator radiation detectors, and solid-state radiation detectors, such as those made of silicon. That patent, which is incorporated herein by reference, described two simple types of GM pancake counters arranged in a back-to-back orientation with a high Z layer of lead located between the counters but external to both GM bodies that would function as a directional sensor. That arrangement provided for detecting photo-Compton electrons and pair electrons emitted from the high or low Z material in the forward or backward directions and the attenuation of the emitted electrons by the high Z material. However, that approach still suffers from the drawbacks of attenuation of electrons caused by the mica windows, lack of commonality sensitivity and the limitations of angular resolution.

Therefore, there is a long-standing need for a Geiger-Mueller type sensor to detect the direction or distribution of directions of incident gamma radiation, and consequently locate the sources of the radioactivity emitting these photons, without suffering from the drawbacks, limitations and shortcomings of other types of Geiger-Mueller ("GM") sensors. This long-standing need has been fulfilled by the GM triode sensor of the present invention comprising a high Z layer of tungsten disposed within a single GM counter to serve as a partition dividing the counter into two subchambers. In this configuration, the tungsten partition provides a source of electrons for each subchamber and insures that the gas composition within each subchamber will be identical, thus achieving a common sensitivity for two GM counters, eliminating attenuation and increasing angular resolution.

In addition to the patents cited above, other pertinent references are:

S. Kronenberg, et al. "Directional detector for arrays Of gamma ray and X-ray sources," Nuclear Instruments and Methods in Physics Research A vol. 378, pp. 531–540, 1996;

S. Kronenberg, et al. "Locating and imaging sources of gamma and X-radiation directly or through thick shields," Nuclear Instruments and Methods in Physics Research A vol. 387, pp. 401–409, 1997; and S. Kronenberg et al., "High Angular Resolution Sensing Of Gamma Rays In Space," Published in SPIE, The International Society for Optical Engineering, Conference Journal, vol. 3116, pp. 49–56, 1997.

SUMMARY OF THE INVENTION

Accordingly, it is an object of this invention to provide a more accurate GM sensor.

It is another object of this invention to provide a GM sensor with tungsten partition to serve as a source of electrons for two subchambers and insure an identical subchamber gas composition, thus achieving common sensitivity for the two GM Counters, far greater accuracy, eliminating attenuation, increasing angular resolution and eliminating signals from background radiation. The important capability of eliminating signals from background radiation is achieved by subtracting output counts of one subchamber from those of the other subchamber, thereby canceling out background.

It is yet another object of the present invention to provide a GM triode sensor having a tungsten partition between each subchamber to detect the direction of incident gamma radiation, and consequently locate the sources of the radioactivity emitting these photons.

These and other objects are accomplished by the GM triode sensor of the present invention, comprising a high Z layer of tungsten disposed within a single housing assembly serving as a partition dividing the counter into two subchambers, or GM counters. The tungsten partition disposed between the subchambers serves as a source of electrons for the subchambers to insure an identical gas composition within each subchamber, thus achieving common sensitivity for the two GM counters, far greater accuracy, eliminating attenuation and increasing angular resolution.

Another embodiment of the present invention is a method for sensing the direction of ionizing gamma radiation, comprising the steps of creating an electrical field in opposing subchambers, separating the subchambers with a partition composed of a first material in a housing composed of a second material, injecting a gaseous mixture within the subchambers, generating secondary electrons in a sidewall from incident gamma radiation, penetrating the outer radiation windows with the secondary electrons, causing ionization charges within the sub-chambers to produce electrical charges and counting the signals for determining a point of origin for the incident gamma radiation.

BRIEF DESCRIPTION OF THE DRAWINGS

These and other objects of the invention will become readily apparent in light of the Detailed Description of the Invention and the attached drawings wherein.

DETAILED DESCRIPTION OF THE INVENTION

GM dual-pancake counters have provided a number of advantages and improvements in the field of radiation detectors, particularly an enhanced ability to discover the direction of a radiation source, but those counters still suffer from a number of disadvantages and shortcomings. One problem with dual-pancake counters was inaccurate output count rates caused by different gaseous atmospheres in each GM counter. Also, the mica windows contributed to the attenuation of primary electrons, thereby reducing the GM dual-pancake counter's sensitivity. In addition, the back-to-back configuration required a thicker GM dual-pancake counter, which could impact angular resolution. The present invention provides a versatile GM triode counter that overcomes the deficiencies, limitations and shortcomings of the dual-pancake type of counter and provides the important property of canceling background radiation.

Figure 1:
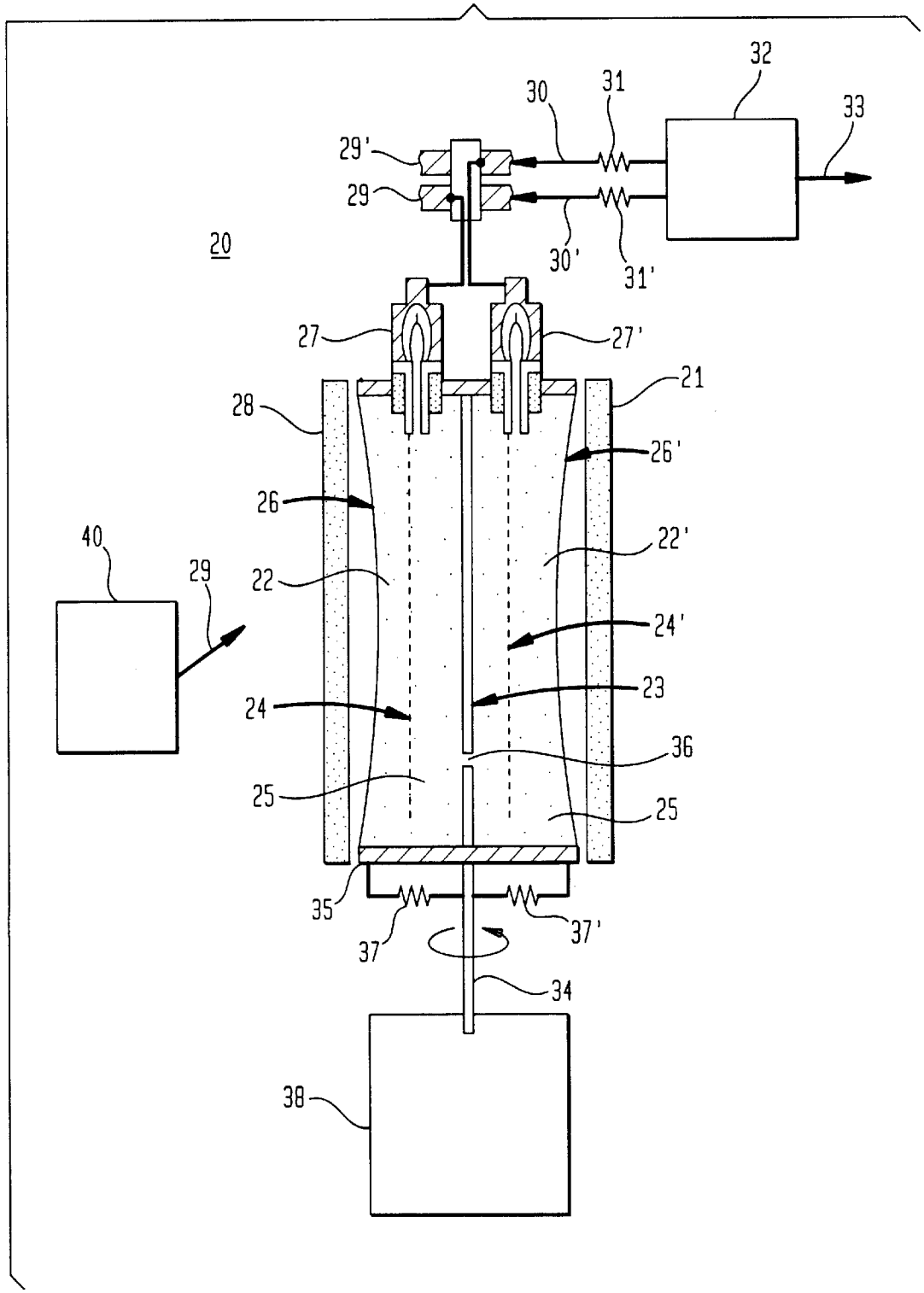
FIG. 1 is a cross-sectional view of the triode GM counter of the present invention.

FIG. 1 is a cross-sectional view of the GM triode directional sensor 20 of the present invention. The GM triode directional sensor comprises a housing 21 containing subchambers 22 and 22' separated by a partition 23 composed of a first material having a high atomic number that is compatible with a gas mixture 25. Each subchamber 22 and 22' further comprising a radiation window 26 and 26', an electrode 24 and 24', a gaseous mixture 25 and one side of partition 23. In this embodiment, the gas mixture was a halogen-quenched gas, which would not be compatible with the lead layer of prior art dual-pancake counters. Tungsten was selected as the first material for partition 23, because tungsten is compatible with the halogen-quenched gas. The tungsten partition 23 includes an aperture 36 to allow the gas 25 to communicate freely from one subchamber to the other and thus maintain an identical gas mixture in both subchambers 22 and 22'. An applied electric field is created between a pair of means for collection 27 and 27' and the housing 21. Both collection means 27 and 27' are located atop housing 21.

In operation, incident gamma rays 29 from a concentration of gamma rays, indicated by box 40, generate electrons based on the photoelectric, Compton and pair effects. These electrons are produced within tungsten partition 23, the housing 21 and the external layers of a second material used to construct sidewall 28 of housing 21. Sidewall 28 is composed of the second material with an atomic number lower than the first material, and can be constructed from a Lucite ® layer. Housing 21 also includes a steel base 35, which in combination with sidewall 28 and caps 27 and 27' seals the housing 21. The electrons penetrate the radiation windows 26 and 26', respectively and generate Kapitsa electrons in the gas mixture, which have low energies of about 3 eV. Thus, after these electrons are accelerated by the applied electric field between the collection means 27 and 27' and housing 21, they become very efficient in ionizing the gas 25 within the housing 21 and producing discharges. The two electrodes 24 and 24', respectively, in sub-chambers 22 and 22', respectively, permit applying a high voltage and collecting the charge generated by the discharge. Each subchamber is topped by the collection means 27 and 27', further comprising a number of connectors, glass seals and ceramic insulators for electrical connections and isolation, and evacuation ports and tip-offs to allow pump-down and gas filling to take place. The sensor 20 will be rotated by a means for rotation 31 along axis 34. A pair of means for detecting signals 29 and 29', respectively, receives the electrical charges generated within said subchambers 22 and 22', respectively, by electrodes 24 and 24', respectively. Pair of brushes 30 and 30', respectively, transmit the signals through resistors 31 and 31', respectively, to a means for data processing 32 to count the electronic signals. An output data lead 33 also serves as a connection to high voltage.

A number of variations of the GM triode directional sensor 20 are within the contemplation of the present invention. The housing 21 also seals the gaseous mixture within subchambers 22 and 22'. The first material for partition 23 should have a high atomic number. The gaseous mixture 25 can be any suitable gas. The first material for partition 23 can be selected from the group consisting of high atomic number elements or compounds compatible with the gaseous mixture, such as tungsten used in the first embodiment of this invention. Other suitable high atomic number materials can also be used so long as they are compatible with the gas selected for gaseous mixture 25. The first material for partition 23 can be tungsten and the second material for sidewall 28 can be aluminum. In the preferred embodiment, two subchambers are used. The signal-detecting means 29 and 29' could be several commutators.

Figure 2:
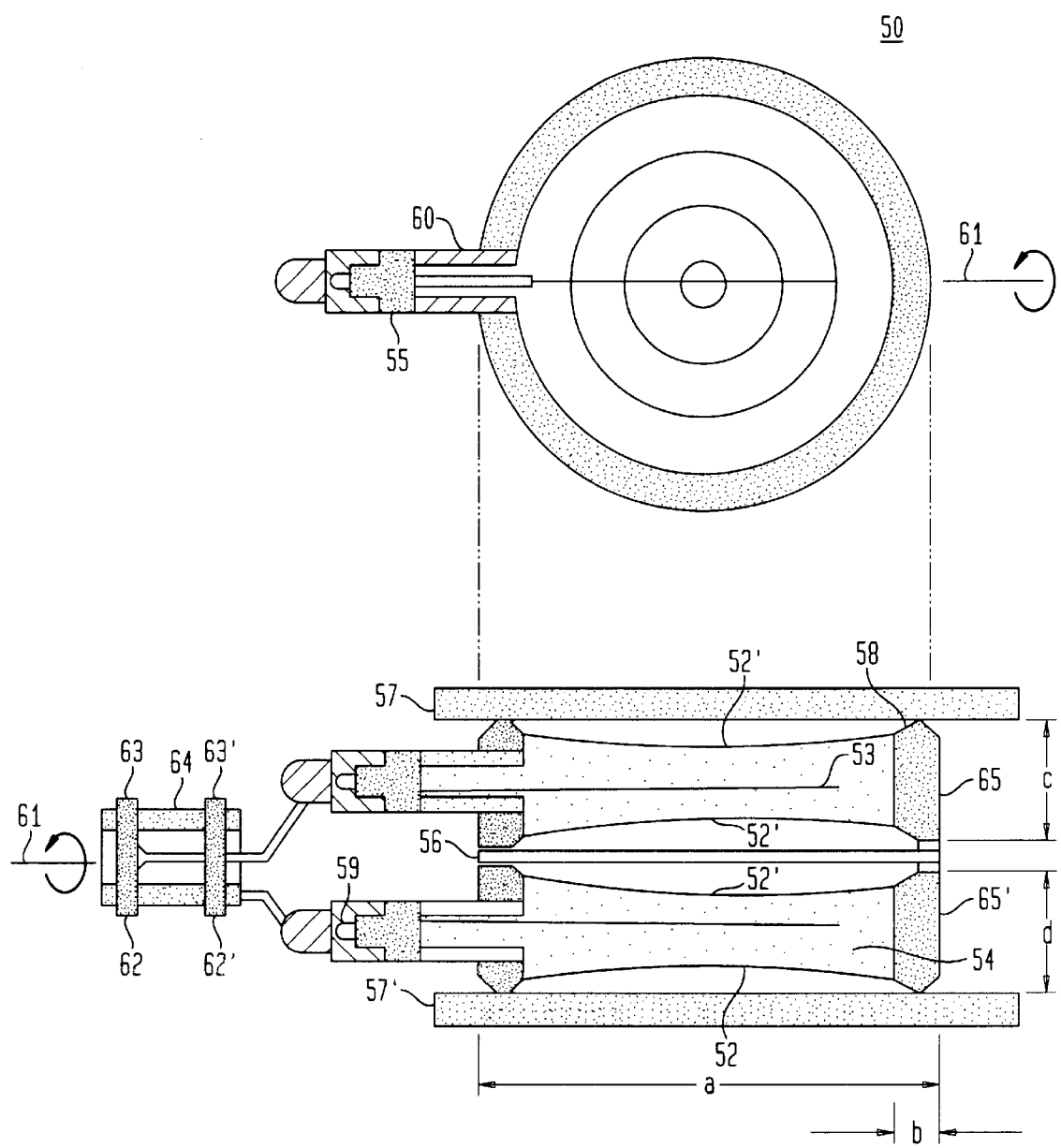
FIG. 2 is a cross-sectional view of the double pancake GM directional sensor in a back-to-back configuration that simulates the triode GM counter of the present invention.

FIG. 2 depicts top and cross-sectional views of a dual-pancake type GM counter 50 with a GM counter 65 placed atop another GM counter 65' in a sandwich configuration with a lead layer 56 disposed between them. Low Z layers of Lucite ® 57 and 57', respectively, are disposed on the outer surfaces of the GM counters 65 and 65'. Each GM counter 65 and 65' also has a thin mica window 52 and 52', respectively, adjacent to the lead layer 56, which is between the GM counters 65 and 65', but external to both counters. Also depicted are commutators 62 and 62', output connections 63 and 63', a seal 58, tip-off 59 and axis of rotation 61. The top view illustrates an output terminal 55, ceramic insulator 60 and axis of rotation 61. In FIG. 2, dimension a is 5.36 cm, dimension b is 0.432 cm and dimensions c and d, representing the widths of GM counters 65 and 65,' are both are 1.55 cm thick.

Figure 3:
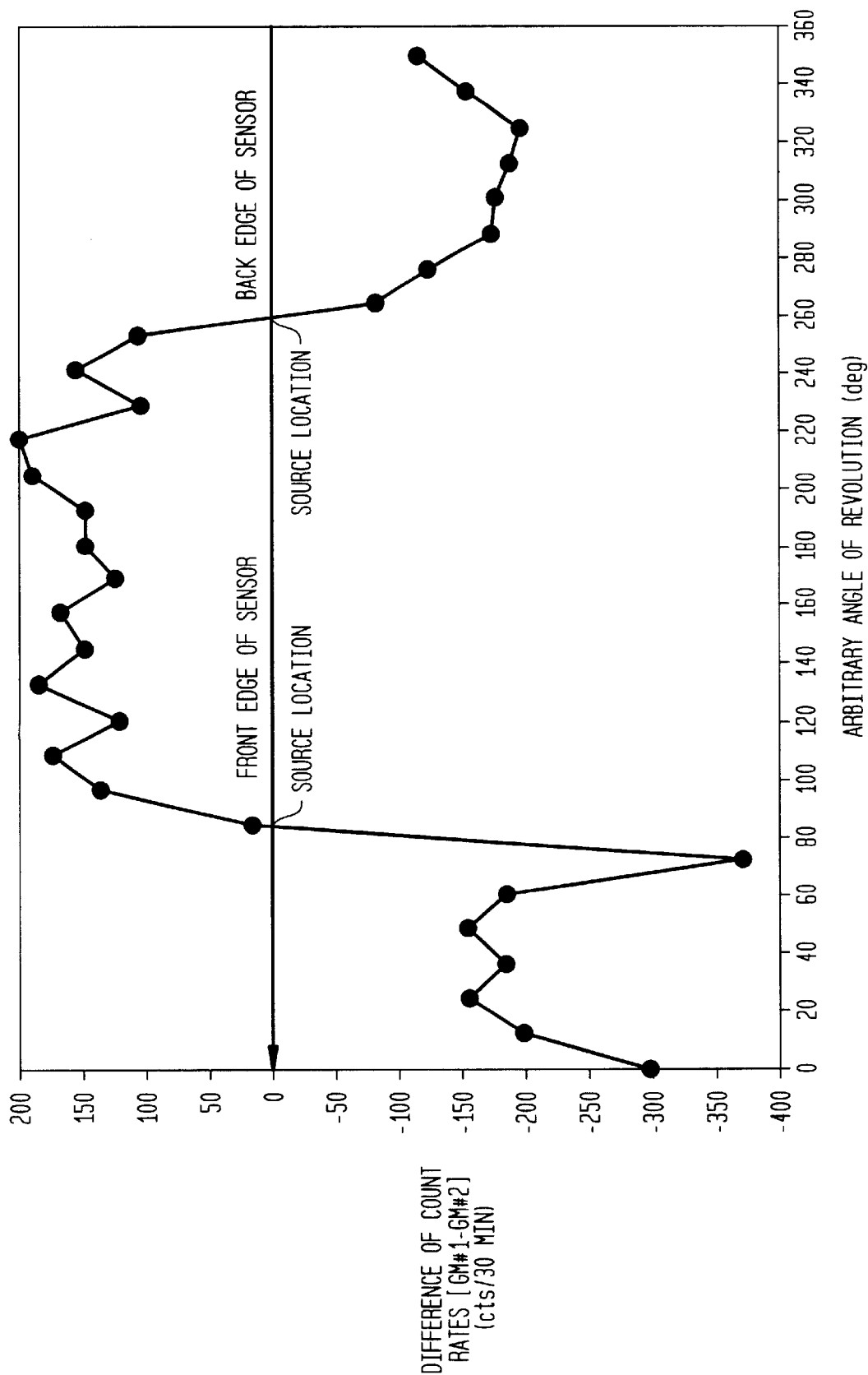
FIG. 3 is a chart depicting a scan of a cesium radiation source by two GM counters in the FIG. 2 back-to-back configuration.

FIG. 3 is a chart depicting a dual-pancake type GM counter sensor scanning a cesium radiation source. The measurements are based on locating radiation sources by subtracting the two output count rates in a monodirectional distribution of cesium gamma ray radiation and analyzing the difference signal electronically. This data was collected from scanning a field of 662 keV gamma rays with the FIG. 2 sensor. The sensor was deployed 52 feet from the radiation source, and then the response data of the two sensors was manually processed to simulate this measurement technique. The results obtained were the difference of the two count rates. The FIG. 3 plot shows the count rate difference versus angle of rotation in the gamma ray field. The angular location of the cesium source is indicated when the difference signal equals zero. The FIG. 3 plot shows that there are two null locations. One image is generated when the front edge of the GM sensor faces the radiation source and the second image is generated when the back edge of the GM sensor rotates around to face the radiation source. It is noted that these two images are exactly 180° apart, and thus they verify the radiation source's angular location. The FIG. 3 results of simulating the GM triode configuration with dual-pancake GM counters clearly demonstrate that the present invention can successfully detect and locate unknown sources of gamma radiation.

Figure 4:
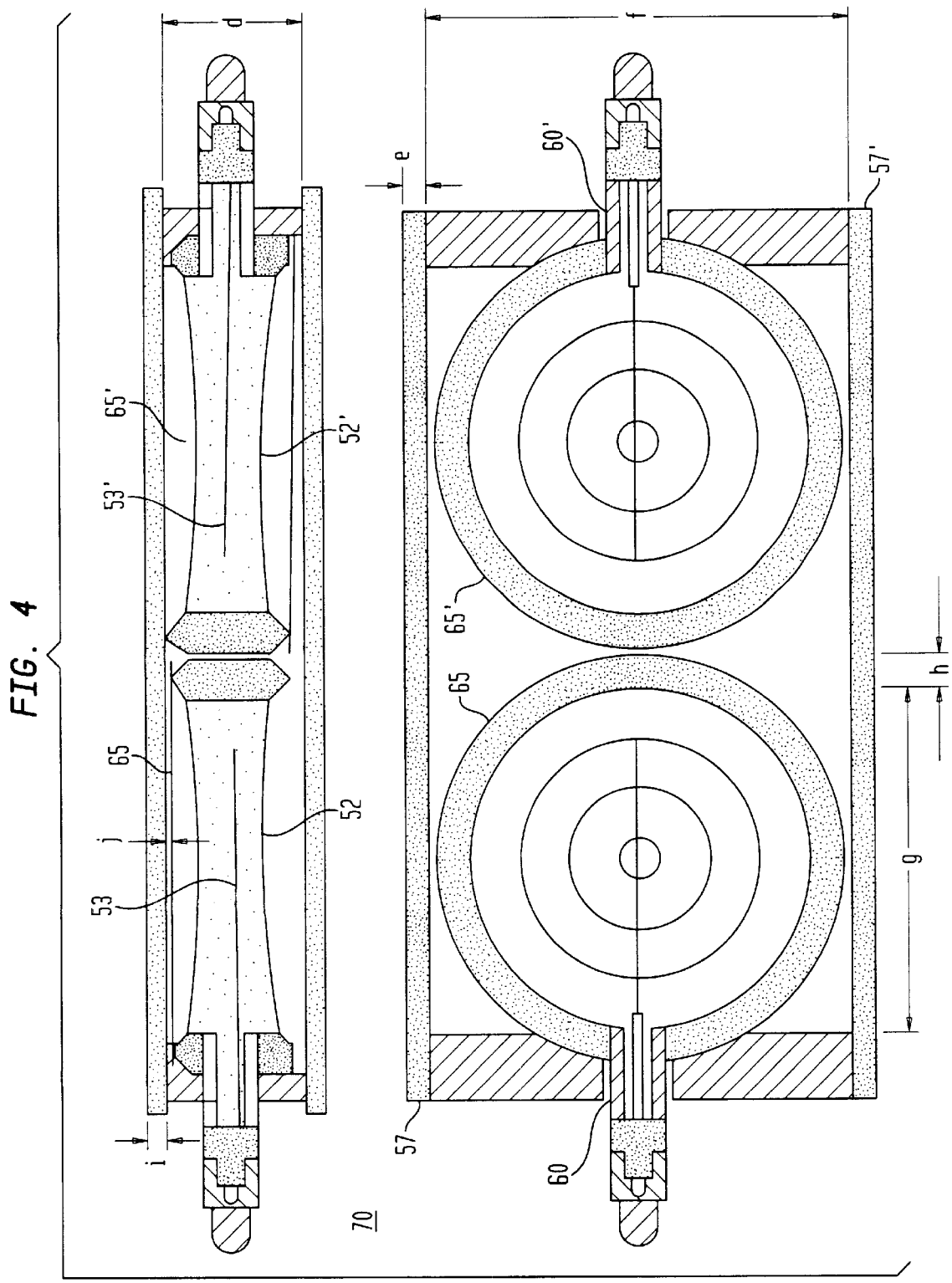
FIG. 4 depicts two pancake counters in a sensor arrangement with one GM counter placed above another GM counter, instead of the back-to-back configuration.

FIG. 4 shows a cross sectional and top view of a GM counter 70 in with GM counters 65 and 65' are placed in a back-to-back configuration, instead of the FIG. 2 stacking arrangement, using FIG. 2 numerals for like structural components. The side view depicts the GM counters 65 and 65', electrodes 53 and 53', respectively, and thin mica windows 62 and 62', respectively. Also depicted are output connections 63 and 63', respectively, for GM counters 65 and 65', respectively. This configuration can also be used to simulate the operation of the GM triode invention. However, the back-to-back arrangement experimentally demonstrates the GM triode's ability to cancel background radiation. This was accomplished by a directional scan of the cesium monodirectional source and another scan of the isotropic radiation background in the inventors' laboratory, with two lead plates removed from the sensor. This test set-up showed a difference signal equal to zero, like in FIG. 3, indicating a complete cancellation within the statistical variation of the counts. In FIG. 4, dimension e is 0.457 cm of Lucite layers 57 and 57', dimension f is 5.283 cm wide, dimension g is 4.382 cm and dimension h is 0.470 cm. In the top view, dimension i is a 0.378 cm Lucite layer disposed on top of GM counter 70, dimension j is an 0.0467 cm layer of lead and dimension d represents the width of GM counter 65,' which is 1.55 cm thick.

Another embodiment of the present invention is a method for sensing the direction of ionizing gamma radiation, comprising the steps of creating an electrical field in opposing subchambers, separating the subchambers with a partition composed of a first material in a housing composed of a second material, said housing having a sidewall and injecting a gaseous mixture within the plurality of subchambers. The second material is permeable by gamma radiation and has an atomic number lower than the first material, with the first material having a high atomic number material compatible with the gaseous mixture. Subsequent steps of the method include generating secondary electrons in a sidewall from an incident gamma radiation, penetrating the outer radiation windows with the secondary electrons, causing ionization charges within the subchambers to produce electrical charges, rotating the housing, sending the electrical charges to a means to detect a signal and transmitting a signal from said signal detecting means to a means for data processing to count said signals for determining a point of origin for said incident gamma radiation. The variations of the GM triode directional sensor also apply to the method of the present invention.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components and dimensions can achieve the results described herein, without departing from the spirit and scope of this invention. Accordingly, the present invention should not be limited by the foregoing description, but only by the appended claims.

What we claim is:

1. A Geiger-Mueller triode directional sensor, comprising:
   a plurality of opposing subchambers are separated by a partition composed of a first material;
   each of said subchambers, having a radiation window, a means for collection, including at least one electrode, a gaseous mixture and said partition, creates an electrical field;
   a housing, having a sidewall adjacent to said radiation windows and composed of a second material permeable by gamma radiation, encloses and seals said plurality of subchambers;
   said second material having an atomic number lower than said first material, said first material being a high atomic number material compatible with said gaseous mixture;
   incident gamma rays generate a plurality of secondary electrons in said side wall;
   said plurality of secondary electrons, being accelerated by said electrical fields, penetrate said outer radiation windows to generate Kapitsa secondary electrons causing ionization charges within said plurality of subchambers;
   said ionization charges producing a plurality of electrical charges collected by said electrodes;
   said sensor being rotatable; and
   a means to detect a signal receives the plurality of electrical charges and transmits a signal to a means for data processing to count said signals for determining a point of origin for said incident gamma rays and to eliminate a plurality of background radiation signals.

2. The Geiger-Mueller triode directional sensor, as recited in claim 1, further comprising said housing seals said gaseous mixture within said subchambers.

3. The Geiger-Mueller triode directional sensor, as recited in claim 2, further comprising said partition having an aperture to allow said gaseous mixture to communicate freely from one subchamber to the other.

4. The Geiger-Mueller triode directional sensor, as recited in claim 3, further comprising said gaseous mixture being homogeneous within said plurality of subchambers.

5. The Geiger-Mueller triode directional sensor, as recited in claim 4, further comprising said gaseous mixture being an organic gas mixture.

6. The Geiger-Mueller triode directional sensor, as recited in claim 5, further comprising said first material being selected from the group consisting of high atomic number compounds compatible with said organic gas mixture.

7. The Geiger-Mueller triode directional sensor, as recited in claim 6, further comprising said housing being constructed from said side wall, said collection means and a steel base.

8. The Geiger-Mueller triode directional sensor, as recited in claim 7, further comprising said first material is tungsten.

9. The Geiger-Mueller triode directional sensor, as recited in claim 8, further comprising said second material is Lucite ®.

10. The Geiger-Mueller triode directional sensor, as recited in claim 9, further comprising said radiation windows being constructed of stainless steel.

11. The Geiger-Mueller triode directional sensor, as recited in claim 10, further comprising said radiation windows being 0.001 $mg/cm^2$ thick.

12. The Geiger-Mueller triode directional sensor, as recited in claim 11, further comprising said Kapitsa secondary electrons having low energies of about 3 eV.

13. The Geiger-Mueller triode directional sensor, as recited in claim 12, further comprising said organic gas mixture being a halogen-quenched gas.

14. The Geiger-Mueller triode directional sensor, as recited in claim 13, further comprising:
   said collection means being disposed atop said housing;
   said collection means having a plurality of connectors, a plurality of glass seals and a plurality of ceramic insulators for electrical connections and isolation; and
   said collection means having a plurality of evacuation ports and a plurality of tip-offs to allow pump-down and gas filling to take place.

15. The Geiger-Mueller triode directional sensor, as recited in claim 14, further comprising at least one of said collection means is provided for each of said subchambers.

16. The Geiger-Mueller triode directional sensor, as recited in claim 15, further comprising said plurality of subchambers being two sub-chambers.

17. The Geiger-Mueller triode directional sensor, as recited in claim 16, further comprising connecting an output data lead to said housing.

18. The Geiger-Mueller triode directional sensor, as recited in claim 17, further comprising said signal-detecting means being a plurality of signal pick-up rings.

19. The Geiger-Mueller triode directional sensor, as recited in claim 18, further comprising said signal-detecting means being a plurality of commutators.

20. A Geiger-Mueller triode directional sensor, comprising:
   a pair of opposing subchambers are separated by a partition composed of a first material;
   each of said subchambers, having a radiation window, an electrode, a gaseous mixture and said partition, creates an electrical field;
   a cylindrical housing, having a cap, a side wall adjacent to said radiation windows and composed of a second material permeable by gamma radiation and a base, encloses and seals said subchambers;
   said second material having an atomic number lower than said first material, said first material being a high atomic number material compatible with said gaseous mixture;
   said partition having an aperture for said gaseous mixture to communicate from one subchamber to another;
   incident gamma rays generate a plurality of secondary electrons in said side wall;
   said plurality of secondary electrons, being accelerated by said electrical fields, penetrate said outer radiation windows to generate Kapitsa secondary electrons causing ionization charges within said subchambers;
   said ionization charges producing a plurality of electrical charges collected by said electrodes;
   said sensor being rotatable; and
   a means to detect a signal receives the plurality of electrical charges and transmits a signal to a means for data processing to count said signals for determining a point of origin for said incident gamma rays and to eliminate a plurality of background radiation signals.

21. The Geiger-Mueller triode directional sensor, as recited in claim 20, further comprising:
   said partition having an aperture to allow said gaseous mixture to communicate freely from one subchamber to the other; and
   said gaseous mixture being homogeneous within said plurality of subchambers.

22. The Geiger-Mueller triode directional sensor, as recited in claim 21, further comprising said gaseous mixture being an organic gas mixture.

23. The Geiger-Mueller triode directional sensor, as recited in claim 22, further comprising said first material being selected from the group consisting of high atomic number compounds compatible with said organic gas mixture.

24. The Geiger-Mueller triode directional sensor, as recited in claim 23, further comprising said housing being constructed from said sidewall, a cap and a steel base.

25. The Geiger-Mueller triode directional sensor, as recited in claim 24, further comprising said first material is tungsten.

26. The Geiger-Mueller triode directional sensor, as recited in claim 25, further comprising said second material being Lucite ®.

27. The Geiger-Mueller triode directional sensor, as recited in claim 26, further comprising said radiation windows being constructed of ruby mica.

28. The Geiger-Mueller triode directional sensor, as recited in claim 27, further comprising said radiation windows being 0.3 mg/cm$^2$ thick.

29. The Geiger-Mueller triode directional sensor, as recited in claim 28, further comprising said Kapitsa secondary electrons having low energies of about 3 eV.

30. The Geiger-Mueller triode directional sensor, as recited in claim 29, further comprising said organic gas mixture being a halogen-quenched gas.

31. The Geiger-Mueller triode directional sensor, as recited in claim 30, further comprising:
   said cap having a plurality of connectors, a plurality of glass seals and a plurality of ceramic insulators for electrical connections and isolation; and
   said cap having a plurality of evacuation ports and a plurality of tip-offs to allow pump-down and gas filling to take place.

32. The Geiger-Mueller triode directional sensor, as recited in claim 31, further comprising said sensor being connected to an output data lead.

33. The Geiger-Mueller triode directional sensor, as recited in claim 32, further comprising said output data lead providing a connection to a source of high voltage.

34. The Geiger-Mueller triode directional sensor, as recited in claim 33, further comprising said signal-detecting means being a plurality of signal pick-up rings.

35. The Geiger-Mueller triode directional sensor, as recited in claim 34, further comprising said signal-detecting means being a plurality of commutators.

36. A method for sensing the direction of ionizing gamma radiation, comprising the steps of:
   creating an electrical field in a plurality of opposing subchambers;
   separating each of said plurality of subchambers by a partition composed of a first material;
   forming a housing from a second material, said housing having a sidewall;
   inserting a radiation window and a means for collection within each of said plurality of subchambers, said collection means including at least one electrode;
   injecting a gaseous mixture within said plurality of subchambers;
   sealing said plurality of subchambers in said housing, said sidewall being adjacent to said radiation windows;
   said second material being permeable by gamma radiation and having an atomic number lower than said first material, said first material being a high atomic number material compatible with said gaseous mixture;

generating a plurality of secondary electrons in said sidewall from an incident gamma radiation;

penetrating said outer radiation windows with said plurality of secondary electrons;

generating Kapitsa secondary electrons to cause ionization charges within said plurality of subchambers to produce a plurality of electrical charges;

collecting said plurality of electrical charges at said at least one electrode;

rotating said housing;

sending the plurality of electrical charges to a means to detect a signal; and transmitting a signal from said signal detecting means to a means for data processing to count said signals for determining a point of origin for said incident gamma radiation and to eliminate a plurality of background radiation signals.

37. The method for sensing the direction of ionizing gamma radiation, as recited in claim 36, further comprising the step of enclosing said plurality of subchambers in said housing during said sealing step.

38. The method for sensing the direction of ionizing gamma radiation, as recited in claim 37, further comprising the step of generating said plurality of secondary electrons in said sidewall by exposing said housing to said incident gamma radiation.

39. The method for sensing the direction of ionizing gamma radiation, as recited in claim 38, further comprising the step of accelerating said plurality of secondary electrons in order to penetrate said outer radiation windows.

40. The method for sensing the direction of ionizing gamma radiation, as recited in claim 39, further comprising said housing sealing said gaseous mixture within said subchambers.

41. The method for sensing the direction of ionizing gamma radiation, as recited in claim 40, further comprising the steps of:

forming said partition with an aperture allowing said gaseous mixture to communicate freely from one subchamber to the other; and thereby keeping said gaseous mixture homogeneous within said plurality of subchambers.

42. The method for sensing the direction of ionizing gamma radiation, as recited in claim 41, further comprising said gaseous mixture being an organic gas mixture.

43. The method for sensing the direction of ionizing gamma radiation, as recited in claim 42, further comprising the step of selecting said first material from the group consisting of high atomic number compounds compatible with said organic gas mixture.

44. The method for sensing the direction of ionizing gamma radiation, as recited in claim 43, further comprising the step of constructing said housing from said sidewall, said collection means and a steel base.

45. The method for sensing the direction of ionizing gamma radiation, as recited in claim 44, further comprising said first material being tungsten.

46. The method for sensing the direction of ionizing gamma radiation, as recited in claim 45, further comprising said second material being Lucite ®.

47. The method for sensing the direction of ionizing gamma radiation, as recited in claim 46, further comprising the step of constructing said radiation windows from stainless steel.

48. The method for sensing the direction of ionizing gamma radiation, as recited in claim 47, wherein said radiation windows is 0.001 mg/cm$^2$ thick.

49. The method for sensing the direction of ionizing gamma radiation, as recited in claim 48, further comprising said Kapitsa secondary electrons having low energies of about 3 eV.

50. The method for sensing the direction of ionizing gamma radiation, as recited in claim 49, further comprising said organic gas mixture being a halogen-quenched gas.

51. The method for sensing the direction of ionizing gamma radiation, as recited in claim 49, further comprising the steps of:

disposing said collection means atop said housing;

said collection means having a plurality of connectors, a plurality of glass seals and a plurality of ceramic insulators for electrical connections and isolation; and said collection means having a plurality of evacuation ports and a plurality of tip-offs to allow pump-down and gas filling to take place.

52. The method for sensing the direction of ionizing gamma radiation, as recited in claim 51, further comprising the step of providing at least one of said collection means for each of said subchambers.

53. The method for sensing the direction of ionizing gamma radiation, as recited in claim 52, wherein said plurality of subchambers is two subchambers.

54. The method for sensing the direction of ionizing gamma radiation, as recited in claim 53, further comprising the step of connecting an output data lead to said housing.

55. The method for sensing the direction of ionizing gamma radiation, as recited in claim 54, wherein said signal-detecting means is a plurality of signal pick-up rings.

56. The method for sensing the direction of ionizing gamma radiation, as recited in claim 55, wherein said signal-detecting means is a plurality of commutators.

* * * * *